US011516716B2

(12) United States Patent
Zhang et al.

(10) Patent No.: US 11,516,716 B2
(45) Date of Patent: Nov. 29, 2022

(54) BANDWIDTH PART/FREQUENCY LOCATION RESTRICTION FOR L1/L2-CENTRIC INTER-CELL MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/131,225

(22) Filed: Dec. 22, 2020

(65) Prior Publication Data

US 2021/0195488 A1 Jun. 24, 2021

Related U.S. Application Data

(60) Provisional application No. 62/953,153, filed on Dec. 23, 2019.

(51) Int. Cl.
*H04W 36/08* (2009.01)
*H04W 36/36* (2009.01)
*H04W 36/24* (2009.01)

(52) U.S. Cl.
CPC ........... *H04W 36/08* (2013.01); *H04W 36/24* (2013.01); *H04W 36/36* (2013.01)

(58) Field of Classification Search
CPC ..... H04W 36/08; H04W 36/24; H04W 36/36; H04W 36/00835; H04W 36/00; H04W 36/0005; H04W 36/0007; H04W 36/0009; H04W 36/0016; H04W 36/03; H04B 7/18541; H04L 47/767
See application file for complete search history.

(56) References Cited

U.S. PATENT DOCUMENTS

| 2016/0302113 | A1* | 10/2016 | Hwang | H04W 16/06 |
| 2019/0182716 | A1* | 6/2019 | Futaki | H04W 80/02 |
| 2020/0037217 | A1* | 1/2020 | Shapiro | H04W 36/08 |
| 2020/0288337 | A1* | 9/2020 | Callender | H04W 24/10 |
| 2020/0344649 | A1* | 10/2020 | Xu | H04W 24/10 |

FOREIGN PATENT DOCUMENTS

| EP | 3528538 A1 | 8/2019 | |
| WO | WO-2021032288 A1 * | 2/2021 | ........ H04W 36/0033 |

OTHER PUBLICATIONS

Abinader, Fuad, et al. "Impact of bandwidth part (BWP) switching on 5G NR system performance." 2019 IEEE 2nd 5G World Forum (5GWF). IEEE, 2019 (Year: 2019).*

(Continued)

*Primary Examiner* — Sharad Rampuria
(74) *Attorney, Agent, or Firm* — Loza & Loza, LLP

(57) ABSTRACT

Aspects of the disclosure relate to configuring, restricting, and/or setting bandwidth part (BWP) or frequency locations for switching from source to target cells in a Layer 1 (L1)/Layer 2 (L2)-Centric Inter-Cell Mobility communication systems. Switching may be allowed for either same, overlapping, or non-overlapping BWPs within an intra-frequency bandwidth shared by the source and target cells.

26 Claims, 12 Drawing Sheets

(56) References Cited

OTHER PUBLICATIONS

HUAWEI., et al., "Discussion on BWP Indication for Intra-Frequency Handover", 3GPP TSG-RAN WG2 Meeting 107, 3GPP Draft, R2-1910604, Discussion on BWP Indication for Intra-Frequency Handover, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), 4 Pages, XP051768379, Retrieved from the Internet: URL: http://www.3gpp.org/ftp/tsg_ran/WG2_RL2/TSGR2_107/Docs/R2-1910604.zip, [retrieved on Aug. 16, 2019], Section 2.
International Search Report and Written Opinion—PCT/US2020/066880—ISA/EPO—dated Mar. 30, 2021.
MEDIATEK Inc: "RRM Measurement Considering Bandwidth Part Operation", 3GPP TSG-RAN WG2 #99-bis, 3GPP Draft, R2-1710882, RRM Measurement Considering Bandwidth Part Operation, 3rd Generation Partnership Project (3GPP), Mobile Competence Centre, 650, Route Des Lucioles, F-06921 Sophia-Antipolis Cedex, France, vol. RAN WG2, No. Prague, Czech, Oct. 9, 2017-Oct. 13, 2017, Oct. 8, 2017 (Oct. 8, 2017), 4 Pages, XP051342898, Retrieved from the Internet: URL: http://www.3gpp.org/ftp/Meetings_3GPP_SYNC/RAN2/Docs/, [retrieved on Oct. 8, 2017], Section 2.2.

* cited by examiner

BANDWIDTH PART/FREQUENCY LOCATION RESTRICTION FOR L1/L2-CENTRIC INTER-CELL MOBILITY

PRIORITY CLAIM

This application claims priority to and the benefit of provisional application No. 62/953,153 filed in the U.S. Patent and Trademark Office on Dec. 23, 2019, the entire contents of which are incorporated herein by reference as if fully set forth below in its entirety and for all applicable purposes.

TECHNICAL FIELD

The technology discussed below relates generally to wireless communication systems, and more particularly, to restricting or setting bandwidth part (BWP) or frequency locations in a Layer 1 (L1)/Layer 2 (L2)-Centric Inter-Cell Mobility communication system.

INTRODUCTION

In particular wireless technologies and standards such as the evolving 3GPP 5G New Radio (NR) standard, particular high frequency transmission waveforms and protocols, as well as the use of multiple transmission/reception points (multi-TRP) have been proposed. Furthermore, 5G NR standards continue to provide enhancements for multi-beam operation, particularly for high frequency transmissions (e.g., frequency range FR2, which encompass approximately 6 GHz and above), as well as for multi-TRP deployments. Some further enhancements in 5G NR include improving inter-cell mobility, which is a procedure that ensures that a wireless user equipment (UE) is able to hand-off from one wireless cell to another wireless cell whenever the UE detects an adjacent wireless cell capable of serving the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to an aspect, a method for wireless communication at a user equipment (UE) in a communication system supporting inter-cell mobility is disclosed. The method includes determining in the UE whether a source cell and a target cell each have at least one bandwidth part (BWP) within a same bandwidth range, and switching from the source cell to the target cell when the source cell and the target cell each have the at least one BWP within the same bandwidth range.

According to another aspect, a user equipment (UE) configured for wireless communication is disclosed including a processor, a transceiver communicatively coupled to the processor; and a memory communicatively coupled to the processor. The processor and the memory are configured to determine in the UE whether a source cell and a target cell in a wireless communication system each have at least one bandwidth part (BWP) within a same intra-frequency bandwidth range. Moreover, the processor and memory are configured to switch from the source cell to the target cell when the source cell and the target cell each have the at least one BWP within the same intra-frequency bandwidth range.

According to another aspect, a method for wireless communication at a radio access network (RAN) entity in a wireless communication system is disclosed. The method includes configuring the RAN entity for communication with a user equipment (UE) in the wireless communication system to: (1) allow the UE to switch from a source cell to a target cell when at least one of a first active downlink (DL) or a first uplink (UL) bandwidth part (BWP) of the target cell is substantially within or equal to a second active DL or a second active UL BWP of the source cell according to a first configuration, or (2) allow the UE to switch from the source cell to the target cell when at least one of the first active DL or the first active UL BWP of the target cell is partially overlapped or non-overlapped with the second active DL or the second UL BWP of the source cell and within a same bandwidth range according to a second configuration. The method further includes selecting one of the first or second configuration for the UE based on whether the first and second active DL or UL bandwidth parts of the target and source cells are determined to be substantially within or identical in bandwidth range, or to be partially overlapped or non-overlapped in bandwidth range. Furthermore, the method includes transmitting the selection of the first or second configuration to the UE.

According to yet another aspect, a radio access network (RAN) entity configured for wireless communication is disclosed including a processor, a transceiver communicatively coupled to the processor, and a memory coupled to the processor. The processor and the memory are configured to configure the RAN entity for communication with a user equipment (UE) in the wireless communication system to: (1) allow the UE to switch from a source cell to a target cell when at least one of an active downlink (DL) or an uplink (UL) bandwidth part (BWP) of the target cell is substantially within or equal to an active DL or UL BWP of the source cell according to a first configuration, or (2) allow the UE to switch from the source cell to the target cell when at least one of the first active DL or the first active UL BWP of the target cell is partially overlapped or non-overlapped with a second active DL or a second active UL BWP of the source cell and within a same bandwidth range according to a second configuration. The processor and memory are also configured to select one of the first or second configuration for the UE based on whether the first and second active DL or UL bandwidth parts of the target and source cells are determined to be substantially within or identical in bandwidth, or to be partially overlapped or non-overlapped in bandwidth, and transmit the selection of the first or second configuration to the UE via the transceiver.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein.

In similar fashion, while exemplary embodiments may be discussed below as device, system, or method embodiments it should be understood that such exemplary embodiments can be implemented in various devices, systems, and methods.

DETAILED DESCRIPTION

Figure 1:
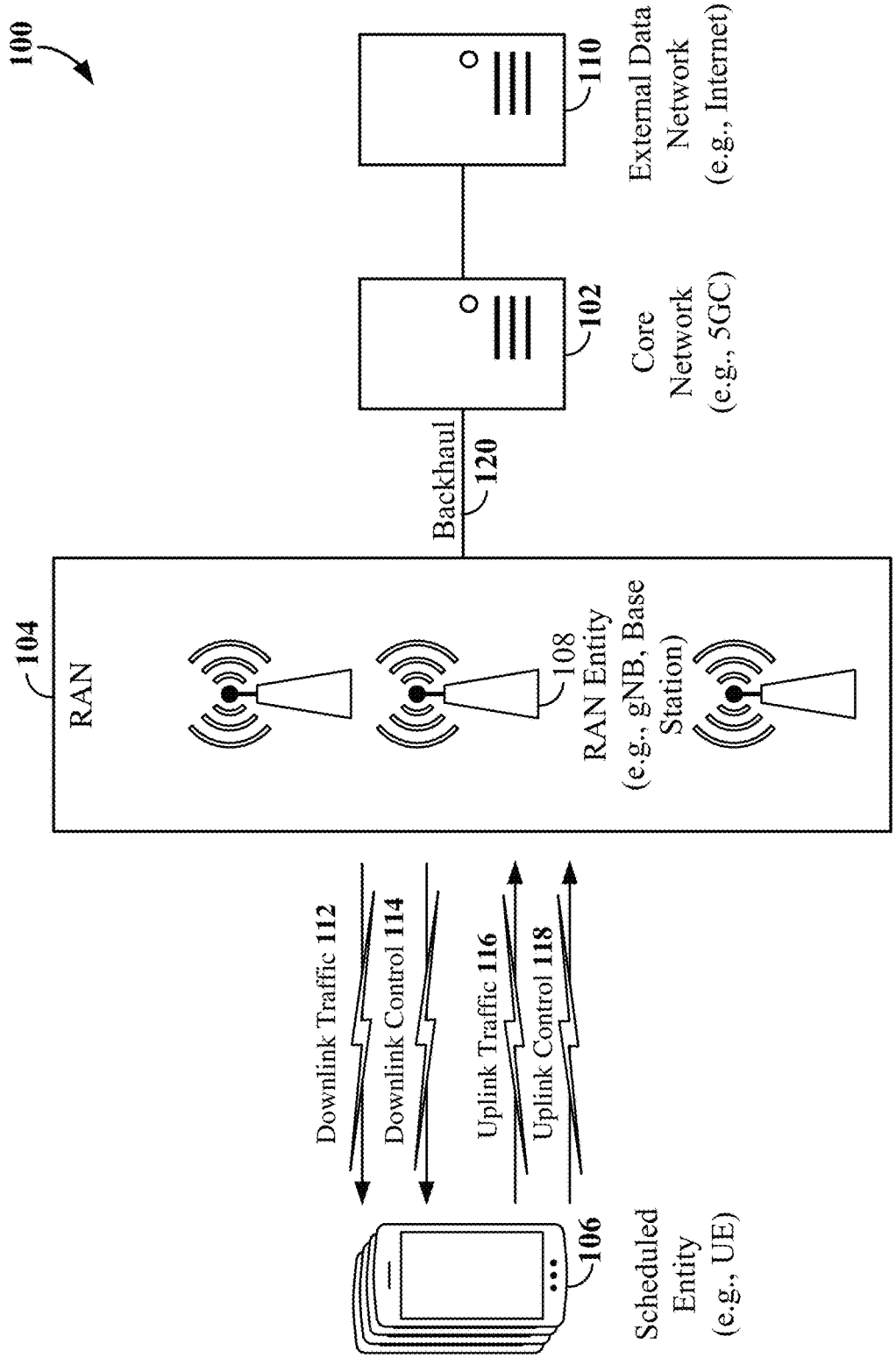
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided based on frequency and wavelength into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Of note, for 5G NR systems inter-cell mobility may be configured to be layer 1 (i.e., the L1 or PHY layer) or layer 2 (i.e., the L2 or MAC layer) centric (i.e., L1/L2-centric). It is noted that within the 5G NR framework, various operation modes for L1/L2-centric inter-cell mobility may be possible for different operational scenarios as will be further described herein. Furthermore, in such L1/L2-centric inter-cell mobility, restriction rules or predetermined behaviors for switching may be established to ensure optimal switching between a source cell and target cell. In particular, the present disclosure provides for restriction, allocation, or predefined behavior for L1/L2 cell switching based on bandwidth part (BWP) or frequency locations for intra and inter frequency switching from source to target cells.

Various aspects of the disclosure relate to L1/L2-centric inter-cell mobility systems, where rules or constraints are determined for bandwidth parts (BWPs) and/or frequency locations of source and target cells for a UE switching or handing off therebetween. In particular, the UE may be configured to be allowed to switch from a source cell to a target cell when BWPs of both cells are substantially identical (e.g., the same frequency location or range) in a first configuration. In other examples, a UE may be allowed to switch when the BWPs of the source and target cells only partially overlap or are non-overlapped in a second configuration. According to further aspects, either the UE and/or a network entity (e.g., gNB or other RAN entity) may determine selection between the first and second configurations. Yet further aspects may allow for switching for BWPs in intra-band frequencies or allowing also for switching in cases of BWPs among inter-band frequencies.

Turning to the drawings, the various concepts presented throughout this disclosure may be implemented across a broad variety of telecommunication systems, network architectures, and communication standards. Referring to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
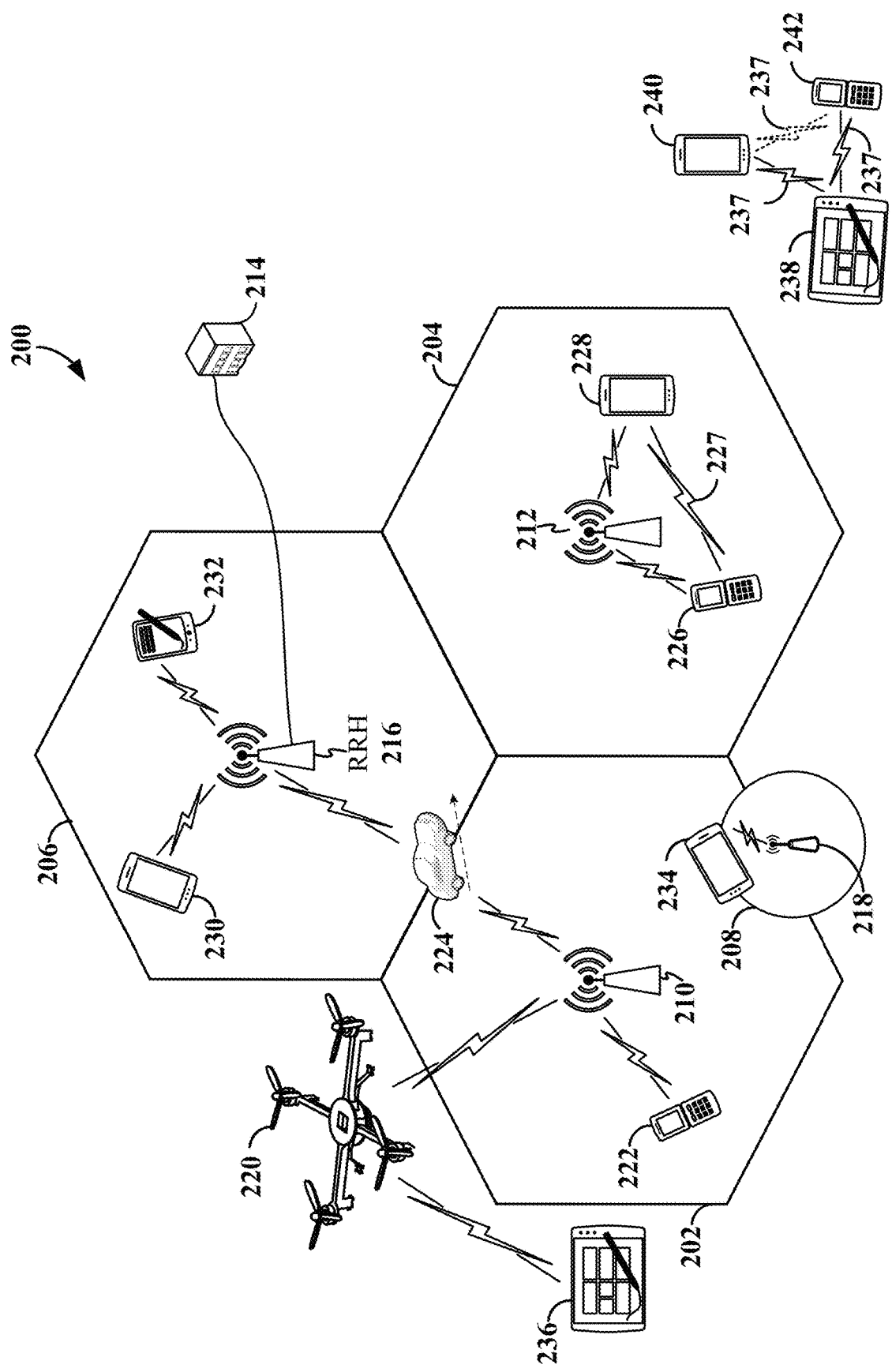
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (I-DMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
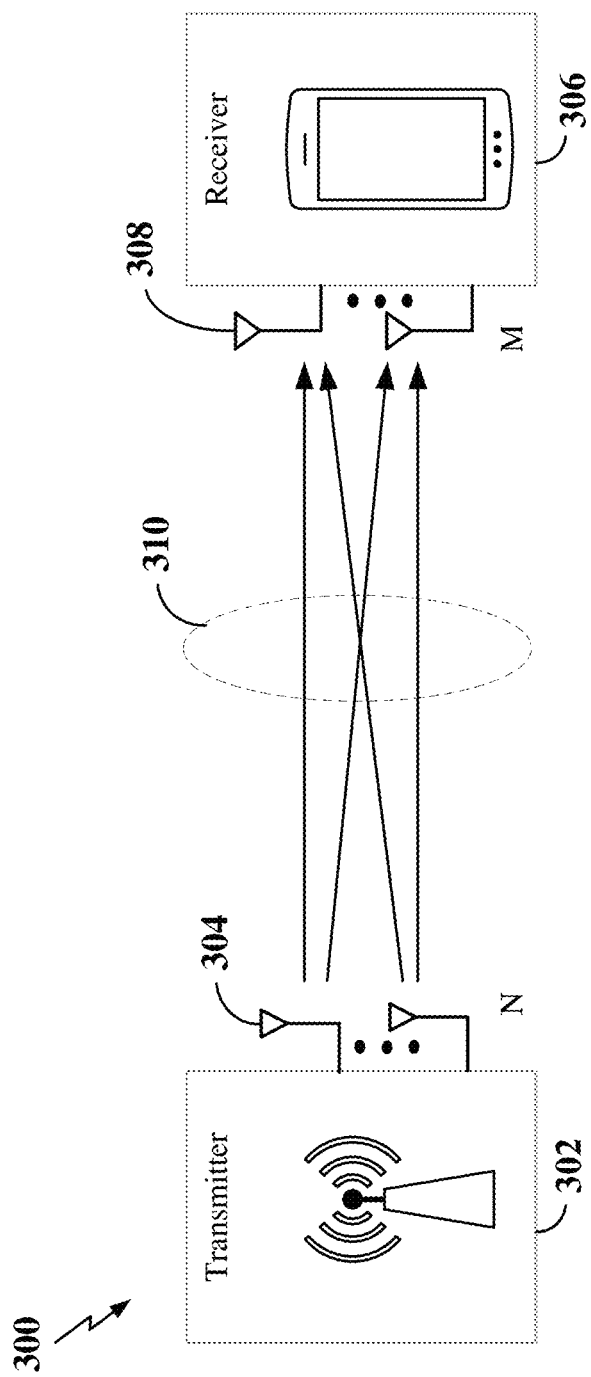
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Figure 4:
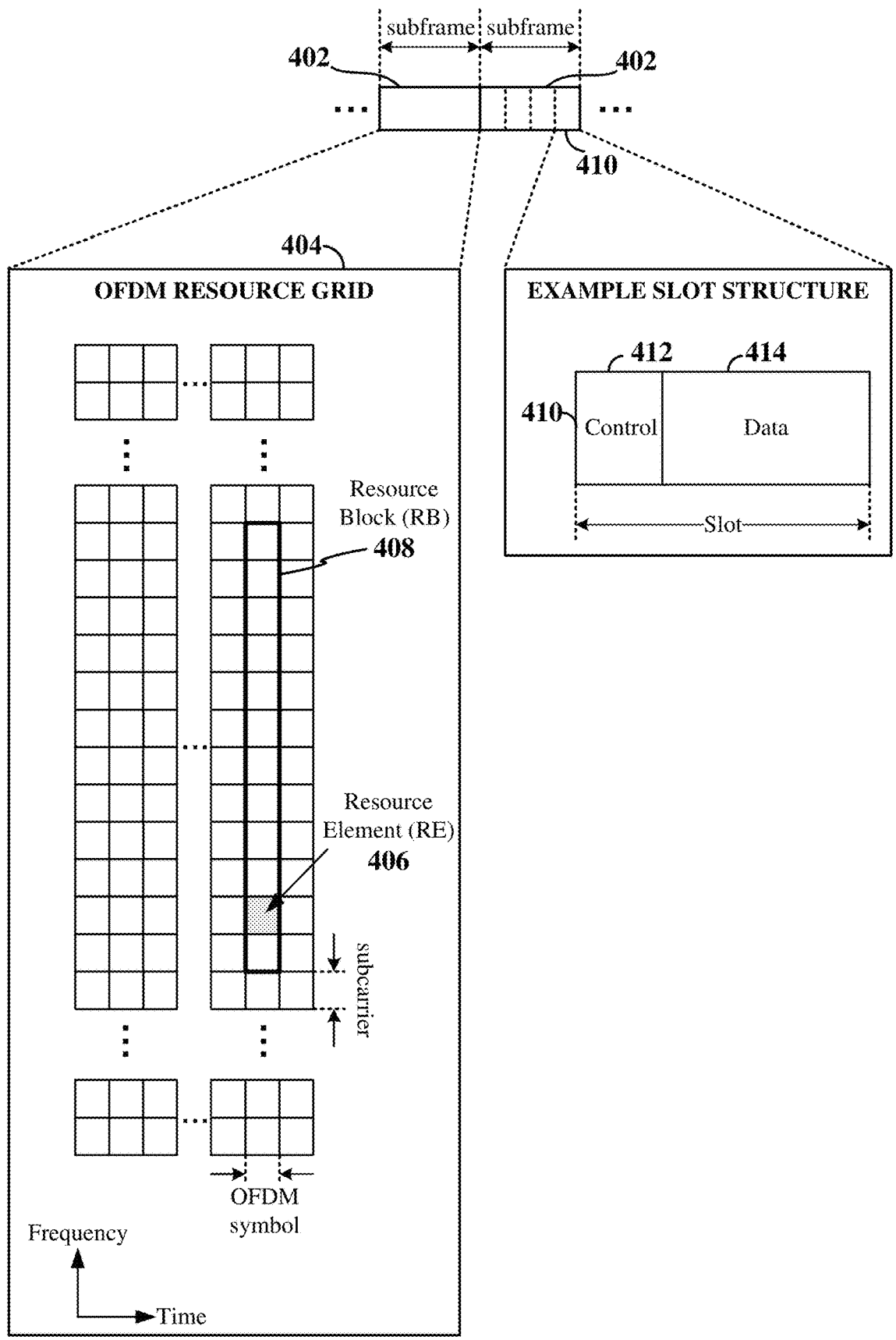
FIG. 4 is a schematic illustration of an organization of wireless resources in an air interface utilizing orthogonal frequency divisional multiplexing (OFDM) according to some aspects.

Various aspects of the present disclosure utilize an OFDM waveform, an example of which is schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs (e.g., scheduled entities) for downlink or uplink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Concerning multi-beam operation of the apparatus in FIG. 2, for example, enhancements in 5G NR for multi-beam operation have targeted FR2 frequency bands, but are also applicable to the FR1 frequency bands. These enhancements have been provided to facilitate more efficient (i.e., lower latency and overhead) DL/UL beam management to support higher intra-cell and L1/L2-centric inter-cell mobility and a larger number of configured transmission configuration indicator (TCI) states. These enhancements may be effected by providing a common beam for data and control transmission/reception for DL and UL, especially for intra-band carrier aggregation (CA). Also, enhancements may be engendered with a unified TCI framework for DL and UL beam indication. Further, enhancements concerning signaling mechanisms for these features can improve latency and efficiency through greater usage of dynamic control signaling as opposed to RRC signaling. Also, enhancements for multi-beam operation may be based on identifying and specifying features to facilitate UL beam selection for UEs equipped with multiple panels, taking into consideration UL coverage loss mitigation due to maximum permissible exposure (MPE) limitations, and based on UL beam indication with the unified TCI framework for UL fast panel selection.

Other enhancements may be for supporting multi-TRP deployment, including targeting both FR1 and FR2 frequency bands. In particular, enhancement may focus on identifying and specifying features to improve reliability and robustness for channels other than PDSCH (i.e., PDCCH, PUSCH, and PUCCH) using multi-TRP or multi-panel with 3GPP Release16 reliability features as the baseline. Additionally, enhancements may concern identifying and specifying QCL/TCI-related enhancements to enable inter-cell multi-TRP operations, assuming multi-DCI based multi-PDSCH reception. Further, beam-management-related enhancements for simultaneous multi-TRP transmission with multi-panel reception may be provided. Still further concerning multi-TRP deployments, enhancements to support high speed train-single frequency network (HST-SFN) deployment scenarios may be provided, such as identifying and specifying solution(s) on QCL assumptions for DMRS (e.g., multiple QCL assumptions for the same DMRS port(s), targeting DL-only transmissions, or specifying QCL/QCL-like relations (including applicable type(s) and the associated requirement) between DL and UL signals by reusing the unified TCI framework.

Figure 5:
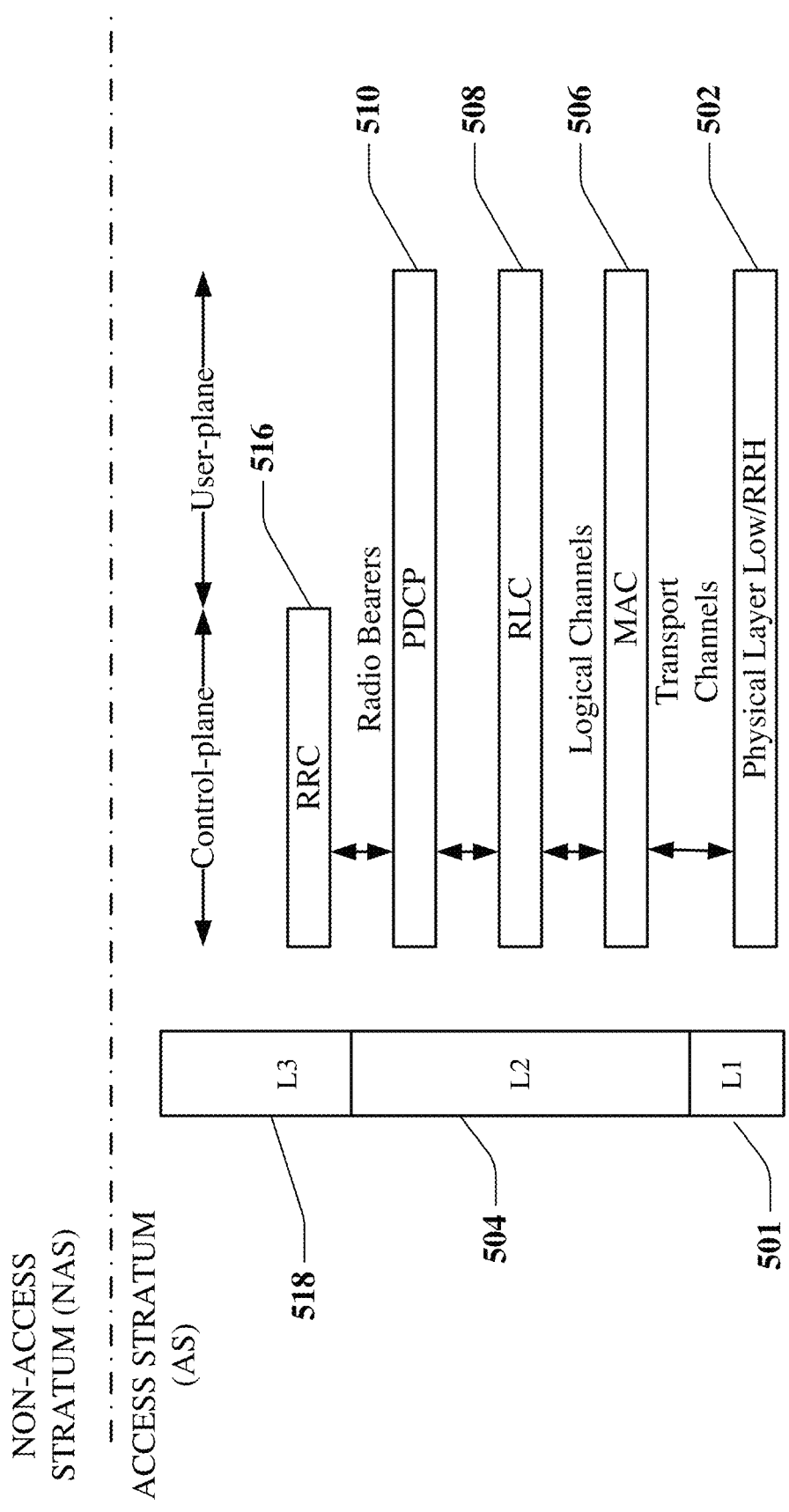
FIG. 5 illustrates a radio protocol architecture for a UE and/or gNB in which the disclosed aspects are operable.

It is further noted that according to certain aspects, the methodology disclosed herein may be implemented at the layer 1 (L1) and layer 2 (L2) levels. Turning to FIG. 5, a generalized radio protocol architecture for a gNB or a UE, but not limited to such, is shown with three layers: Layer 1, Layer 2, and Layer 3. Layer 1 501 is the lowest layer and implements various physical layer signal processing functions, as well as the remote radio head (RRH) in the case of gNBs. Layer 1 will be referred to herein as the physical layer 502 or PHY layer. Layer 2 (L2 layer) 504 is above the physical layer 501 and is responsible for the link between a UE and a gNB over the physical layer 501.

In the user and control planes, the L2 layer 504 includes a media access control (MAC) sublayer 506, a radio link control (RLC) sublayer 508, and a packet data convergence protocol (PDCP) 510 sublayer, which are terminated at the eNB on the network side. Although not shown, a gNB or a UE may have several upper layers above the Layer 2 504 including a network layer (e.g., IP layer) on the network side, and an application layer that is terminated at the other end of the connection (e.g., far end UE, server, etc.).

The PDCP sublayer 510 provides multiplexing between different radio bearers and logical channels. The PDCP sublayer 510 also provides header compression for upper layer data packets to reduce radio transmission overhead, security by ciphering the data packets, and handover support for UEs between gNBs. The RLC sublayer 508 provides segmentation and reassembly of upper layer data packets, retransmission of lost data packets, and reordering of data packets to compensate for out-of-order reception due to hybrid automatic repeat request (HARQ). The MAC sublayer 506 provides multiplexing between logical and transport channels. The MAC sublayer 506 is also responsible for allocating the various radio resources (e.g., resource blocks) in one cell among the UEs. The MAC sublayer 506 is also responsible for HARQ operations.

In the control plane, the radio protocol architecture for the UE and gNB may be substantially the same for the physical L1 layer 501 and the L2 layer 504 with the exception that there is no header compression function for the control plane. The control plane may also include a radio resource control (RRC) sublayer 516 in Layer 3 518. The RRC sublayer 516 is responsible for obtaining radio resources (i.e., radio bearers) and for configuring the lower layers using RRC signaling between the gNB and the UE.

As mentioned above, certain enhancements in 5G NR for multi-beam or multi-TRP operations may include L1/L2-centric inter-cell mobility. Thus, the control for effecting UE mobility between cells (e.g., switching or handoffs between cells) is accomplished through controls and/or signaling in the L1 and/or L2 layers rather than at higher layers above the L2 layer; hence being L1/L2 "centric." According to aspects herein, operational modes or characteristics of this L1/L2-centric inter-cell mobility are disclosed. Broadly, aspects of the present disclosure provide methods and apparatus for operation of inter-cell mobility where at least one serving cell in a communication system are configured with one or more physical layer cell IDs (PCIs) according to a particular selected mode of operation through the use of either signaling or settings for the physical (PHY) layer or the media access control (MAC) layer. Further, based on the mode of operation, a radio resource head (RRH) will serve at least one user equipment (UE) based on power information received from at least one UE (e.g., RSRP information).

In one particular operational aspect, each serving cell may be configured to have one physical layer cell identifier (PCI), but can have multiple physical cell sites, such as having multiple remote radio heads (RRHs). Each RRH may transmit a different set of SSB IDs but with same, single PCI for the serving cell. According to a couple of examples, the selection may be accomplished through Layer 1 (L1) signaling using downlink control information (DCI) in the L1 PHY layer or MAC-CE in the L2 MAC layer. In particular, DCI/MAC-CE is used to effect selection of which RRH(s) or corresponding SSBs will serve a UE based on the RSRP per each reported SSB ID.

In another aspect, rather than only one PCI, each serving cell can be configured with multiple PCIs. Here, each RRH of the serving cell can use one PCI configured for the corresponding serving cell and may transmit a full set of SSB IDs. Selection of which RRH(s) or corresponding PCI(s) and/or SSB(s) serve the UE may be accomplished by DCI/MAC-CE and also based on an RSRP per reported SSB ID per reported PCI. In still another aspect, each serving cell may have one PCI, but the DCI/MAC-CE can be used to select which serving cell(s) or corresponding serving cell ID(s) will serve the UE based on the RSRP per reported SSB ID per reported PCI.

The different operational options above are not necessarily limited to SSB IDs, but rather may be applied generally to any cell-defining RS, such as CSI-RS or positioning reference signals (PRS), as examples. According to other aspects, it is noted that for the different operational options, DCI/MAC-CE based cell selection may be applied to only certain cell types. For example, applicable cell types may include any combination of a primary cell (PCell), secondary cells (SCells), and primary secondary cells (PSCells). In certain aspects, the DCI/MAC-CE may be configured to only select or deselect SCells or PSCells for the UE, but not the PCell as this is the primary cell.

The various possible modes of operation for L1/L2-centric inter-mobility described above may include: (1) Mode 1 where DCI/MAC-CE controls can be used to select which RRH(s) or corresponding SSBs to serve the UE; (2) Mode 2 where DCI/MAC-CE controls can be used to select which RRH(s) or corresponding PCI(s) and/or SSB(s) to serve the UE; and (3) Mode 3 where DCI/MAC-CE controls can be used to select which serving cell(s) or corresponding serving cell ID(s) to serve the UE. In at least these three modes of operation, restriction rules, predefined behaviours or settings, or selections may be needed for bandwidth part (BWP) and/or frequency locations of the source and target cells when switching therebetween is performed, and further that the cells can be identified by different SSB IDs, PCIs, or serving cell IDs. It is noted that a BWP may be a contiguous set of physical resource blocks (PRBs) on a given carrier. These PRBs may be selected from a contiguous subset of shared or common resource blocks for a given numerology. Each BWP defined for a given numerology may have a particular subcarrier spacing, symbol duration, and a cyclic prefix (CP) length.

Figure 6:
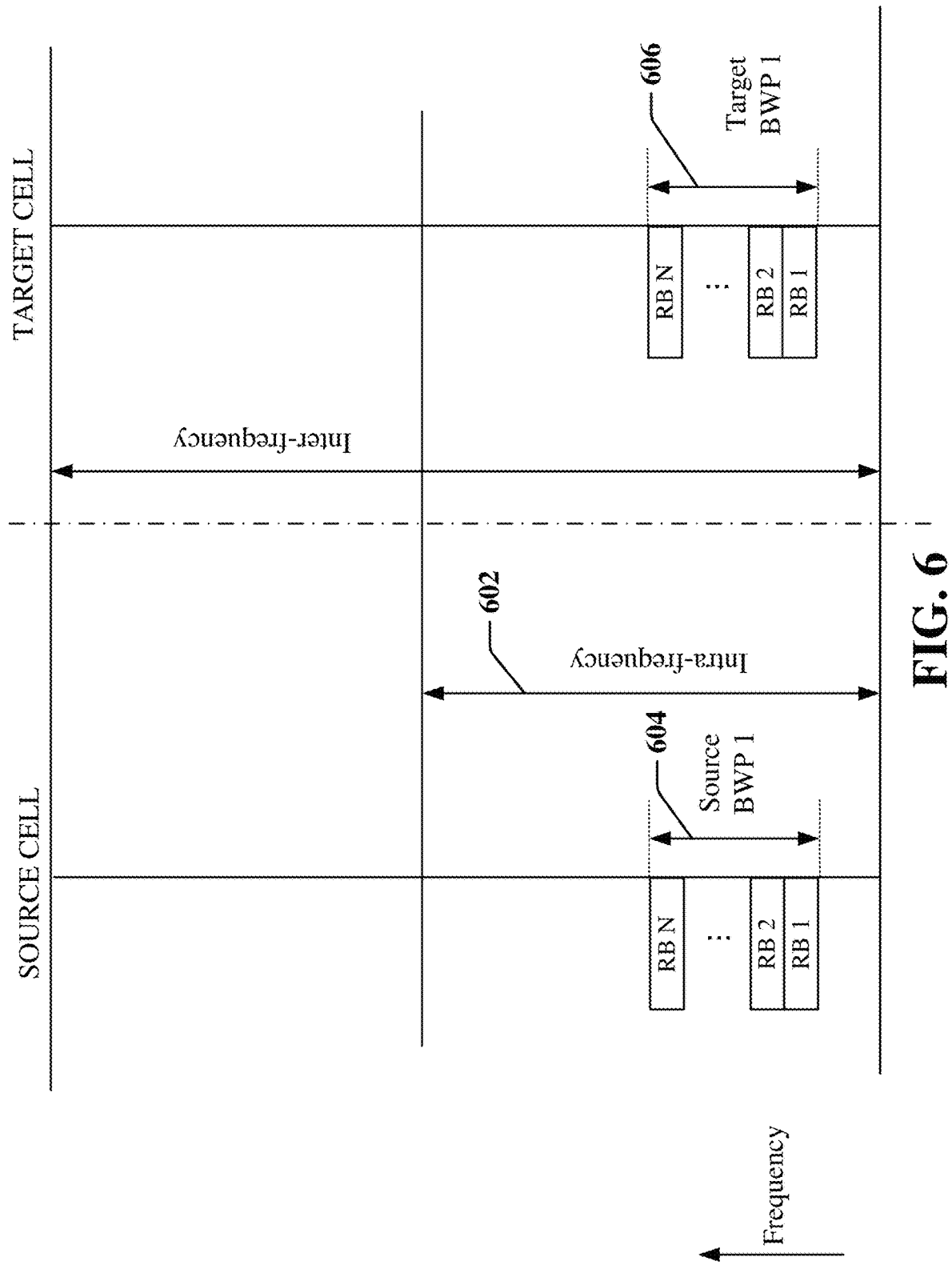
FIG. 6 illustrates an example of bandwidth parts (BWPs) used in both a source cell and a target cell according to some aspects.

According to an aspect, restrictions, rules, settings, or allocations may be established where L1/L2 cell switching for inter-cell mobility is only allowed or performed when intra-frequency commonality exists between the source and target cells for matching or substantially matching BWPs. In one example within the context of intra-frequency switching, a UE may be configured to expect or only consider that the active DL and UL bandwidth part (BWP) or frequency location of a target cell is confined within or substantially the same as the active DL and UL BWP of the source cell. As an example of this scenario, FIG. 6 illustrates exemplary frequency BWPs used in a source cell and a target cell, which are shown side by side to illustrate BWP correspondence between the two cells. In this example, when both the source and target cells utilize BWPs that are intra-frequency (i.e., in the same frequency range 602), and further that a source cell BWP 604 with an N number of resource blocks (RB) and target cell BWP 606 are substantially the same, switching is allowed, and a UE will switch from the source to the target cell. Although not shown, if the BWP 606 has a smaller overall bandwidth or frequency location than BWP 604, this also would fall within the frequencies of the BWP 604 and would be allowable for switching. It is also noted that although both bandwidth parts are shown with an "N" number of RBs, the correspondence is not limited to such and each bandwidth part may have different numbers of RBs. Also, it is noted that the BWPs illustrated may be used in either DL or UL transmissions.

Figure 7:
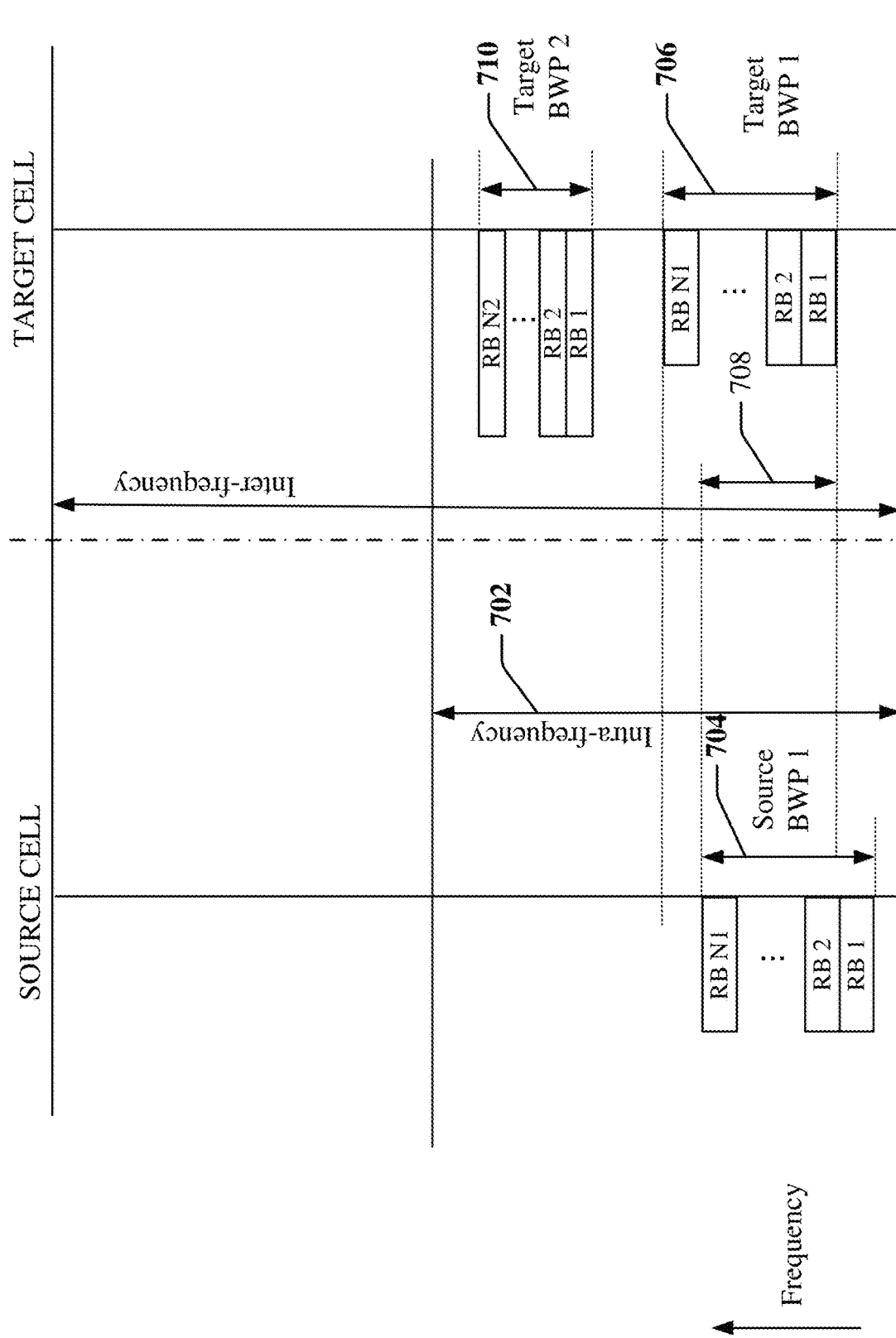
FIG. 7 illustrates another example of BWPs used in both a source cell and a target cell according to some aspects.

According to another aspect, the active DL/UL BWP of the target cell does not need to be confined within or identical to that of the source cell. That is, the DL/UL BWP may be partially overlapping or non-overlapping within the intra-frequency L1/L2 cell switching. Thus, restrictions, rules, settings, or allocations may be established where L1/L2 cell switching for inter-cell mobility is only allowed or performed when intra-frequency commonality exists between the source and target cells, but not necessarily with matching DL/UL BWPs. As an example of this scenario, FIG. 7 illustrates exemplary frequency BWPs used in a source cell and a target cell, which are shown side by side to illustrate BWP correspondence between the two cells. In this example, when both the source and target cells utilize BWPs that are intra-frequency (i.e., in the same frequency range 702), but a source cell BWP 704 with an N number of resource blocks (RB) and a target cell BWP 706 merely overlap (illustrated by frequency range 708), a UE will be allowed to or will be configured to perform switching from the source to the target cell. In another illustrated scenario, even if the target cell has a BWP 710 that does not overlap at all with the source cell BWP 704, but is still within the intra-frequency range 702, a UE will be allowed to or will be configured to perform switching from the source to the target cell. It is also noted that although the bandwidth parts are shown with a same "N" number of RBs, the correspondence is not limited to such and each bandwidth part may have different numbers of RBs. Also, it is noted that the BWPs illustrated may be used in either DL or UL transmissions.

According to another aspect, one or both of a gNB and UE may be configured to dynamically determine or select between whether to implement the rules, constraints, or restrictions shown in the example illustrated by FIG. 6 or the example illustrated by FIG. 7. The dynamic determination functionality may be implemented through the use of RRC, MAC-CE, or DCI signaling according to certain aspects. In certain other aspects, the dynamic determination or selection is made in a RAN entity (e.g., gNB) and communicated to a UE, although is not necessarily limited to such.

In still another aspect, L1/L2 inter-cell mobility switching may be allowed when both intra and inter-frequency BWPs are present in the comparison of BWPs in the source and target cells. It is further noted that, in an aspect, bandwidth parts having RBs or carriers that are intra-frequency may be within the same operating frequency band (i.e., intra-band) and the BWPs may be either contiguous in frequency or non-contiguous in frequency. Additionally in other aspects, the present disclosure is also applicable to BWPs that are in different frequency bandwidths (e.g., inter-frequency), in which case the RBs or carriers may belong to different operating frequency bands (e.g., inter-band).

Figure 8:
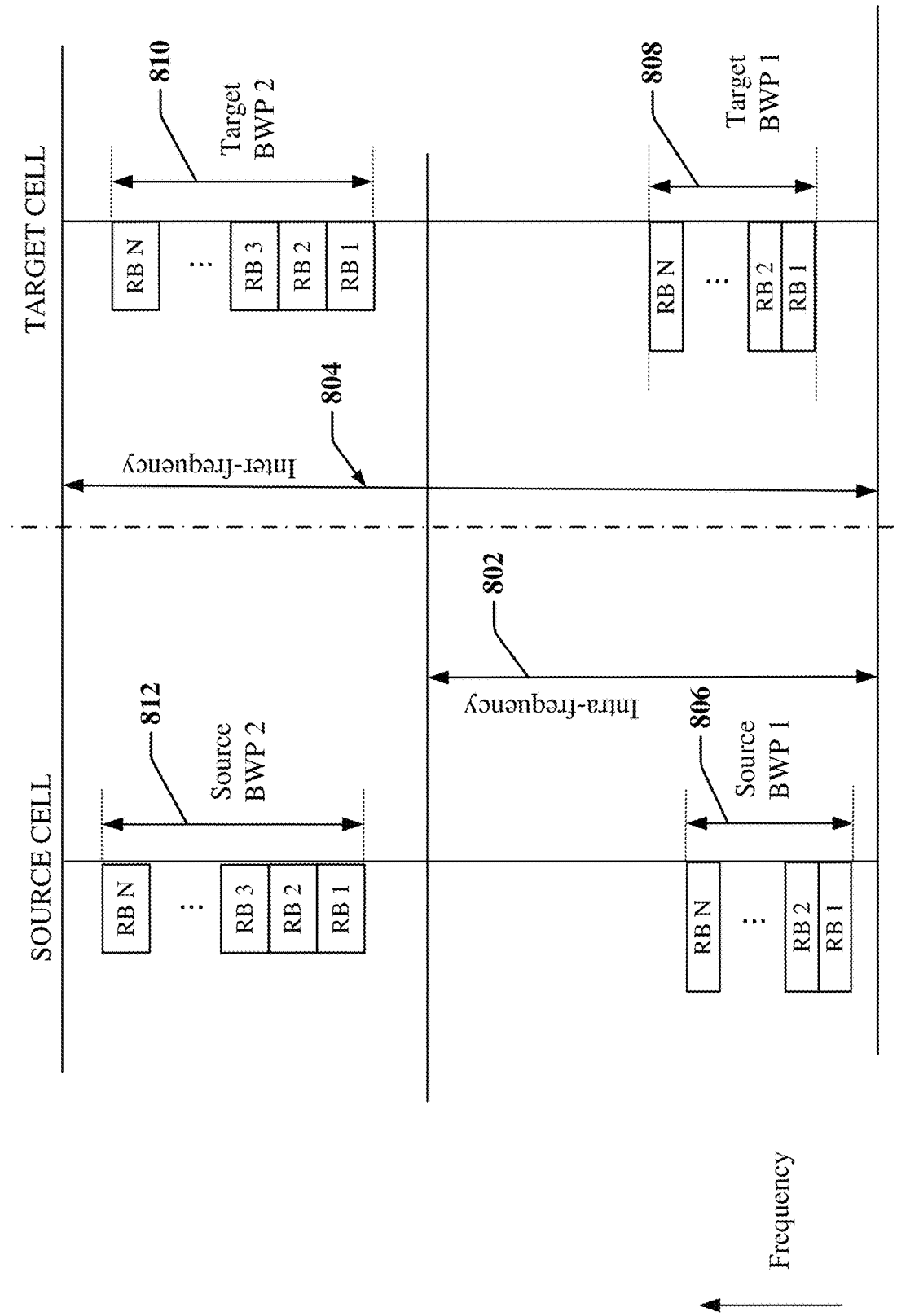
FIG. 8 illustrates a further example of BWPs used in both a source cell and a target cell according to some aspects.

In particular, inter-frequency L1/L2 cell switching may include one or both of the two cases of intra-band and inter-band inter-frequency L1/L2 cell switches. As a visual example of this scenario, FIG. 8 illustrates exemplary frequency BWPs used in a source cell and a target cell, which are shown side by side to illustrate BWP correspondence between the two cells. In this example, both the source and target cells utilize BWPs that are intra-frequency (i.e., in the same frequency range 802) and also utilize BWPs in other frequency ranges (e.g., the inter-frequency range 804, which includes frequencies above or in addition to the intra frequency range 802 in this example). Also in this example, L1/L2 cell switching could be configured to allow switching when there are intra-band BWPs such as BWP 806 and BWP 808. Additionally, the cell switching can be configured to allow switching when there is a BWP in the inter-frequency range as shown by BWP 810 or BWP 812, as examples. It is noted that although the bandwidth parts are shown with an "N" number of RBs, the same RB numbers among the BWPs is not limited to such and each bandwidth part may have different numbers of RBs based on different numerologies.

Figure 9:
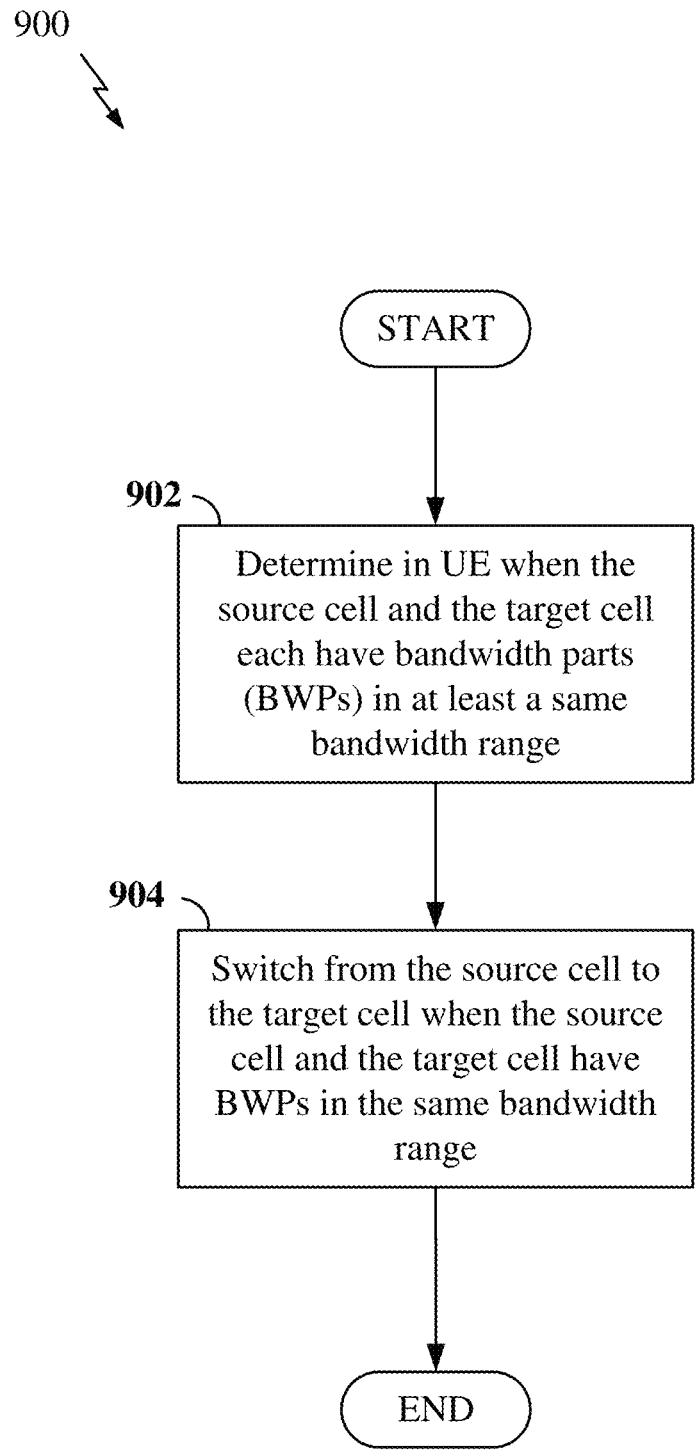
FIG. 9 is a flow chart illustrating a method in UE for L1/L2 inter-cell mobility switching according to some aspects.

FIG. 9 illustrates a flow chart of an exemplary method 900 for cell switching in an inter-cell mobility system according to various aspects of the present disclosure. As described below, some or all illustrated features may be omitted in a particular implementation within the scope of the present disclosure, and some illustrated features may not be required for implementation of all embodiments. In some examples, the method 900 may be carried out by the UE 1000 illustrated in FIG. 10 and may also include processes implemented in the RAN entity 1200 illustrated in FIG. 12. In some examples, the method 900 may be carried out by any suitable apparatus or means for carrying out the functions or algorithm described below.

As shown at block 902, method 900 includes determining whether the source cell and the target cell each have at least one bandwidth part (BWP) or at least one shared frequency band within a same bandwidth range or portion, which may include an intra-frequency bandwidth range or an inter-frequency bandwidth range in other aspects. It is noted that an example of this BWP or shared frequency band are the BWPs within the intra-frequency or inter-frequency bandwidth ranges as illustrated in FIGS. 6-8 (e.g., 602, 702, or 802 or 804). Additionally, in other particular aspects the method 900 may include just a portion of the intra-frequency bandwidth and does not necessarily include the entire intra-frequency bandwidth. In alternative aspects, method 900 may include a shared or common BWPs or frequency bands both in at least a portion of the intra-frequency bandwidth range and also in at least a portion of the inter-frequency bandwidth range as shown specifically in the example of FIG. 8. Moreover, the BWPs may constitute BWPs having substantially the same frequency bandwidth as illustrated in FIG. 6 or overlapping or non-overlapping BWPs as illustrated in the example of FIG. 7. Further, the determination in block 904 may be performed in a user equipment (UE) configured for switching from a source cell to a target cell in a layer 1 (L1) or layer 2 (L2) controlled inter-cell mobility system At block 904, method 900 includes switching, within the UE, from the source cell to the target cell when the source cell and the target cell each have at a least one or more bandwidth parts within the same bandwidth portion or range. Again, the BWPs may have substantially the same BWP frequency range, as well as overlapping or non-overlapping frequency ranges within the intra-frequency and/or inter-frequency bandwidth ranges.

In further aspects, method 900 may expressly include the UE configured to switch from source to target cells based on a predetermined setting expecting at least one of an active downlink (DL) or an uplink (UL) BWP of the target cell is substantially within or equal to an active DL or UL BWP of the source cell, as shown in the example of FIG. 6. In other aspects, method 900 may expressly include that the UE is configured to switch based on a predetermined setting expecting at least one of an active DL or UL BWP of the target cell is partially overlapped or non-overlapped with an active DL or UL BWP of the source cell and still within the bandwidth range shared by the target and source cells.

In yet other aspects, method 900 may expressly include the UE configured to either (1) switch based on a predetermined setting expecting at least one of an active downlink (DL) or an uplink (UL) BWP of the target cell is substantially within or equal to an active DL or UL BWP of the source cell according to a first configuration; or (2) switch based on a predetermined setting expecting at least one of the active DL or UL BWP of the target cell is partially overlapped or non-overlapped with an active DL or UL BWP of the source cell and still within the common or intra-frequency bandwidth shared by the target and source cells according to a second configuration. Further, method 900 may include dynamically selecting between the first configuration or the second configuration in the UE based on whether the BWPs are determined to be substantially the same, partially overlapping, or non-overlapping. In further aspects, the dynamic selection between the first and second configurations may be made in conjunction with control signaling from a RAN entity, such as a base station or gNB. In this case, the RAN entity may determine or assisting in determining selection between the first and second configurations based on the BWPs of source and target cells and send control signaling to the UE. The control signaling may be by one of radio resource control (RRC) signaling, at least one MAC control element (MAC-CE), or at least one downlink control information (DCI).

Method 900 may also include, within the UE, performing switching from the source cell to the target cell when the source cell and the target cell have at least one of common BWPs or frequency bandwidth or when the source cell and the target cell do not have any common BWPs or frequency bandwidth (e.g., inter-frequency BWPs). In yet further aspects, it is noted that the layer 1 (L1) control for method 900 may include at least one downlink control information (DCI). Furthermore, the layer 2 (L2) control may include at least one MAC control element (MAC-CE).

Additionally, in certain aspects the source and target cells may be identified by at least one of PCIs, or serving cell IDs or RRHs or corresponding synchronization signal block (SSB) IDs. Moreover, the communication system in which method 900 is performed may operable according to at least one of: (1) a first mode wherein the L1 or L2 are configured to select which remote radio head (RRH) or an SSB corresponding to the RRH serve the UE; (2) a second mode wherein the L1 or L2 are configured to select which remote radio head (RRH) or a PCI corresponding to the RRH, or an SSB serve the UE; or (3) a third mode wherein L1 or L2 are configured to select which serving cell or a serving cell ID corresponding to the serving cell serve the UE.

In yet further aspects, it is noted that method 900 may include determining whether the source cell and the target cell each have a bandwidth part (BWP) within at least one a same intra-frequency bandwidth range or a same inter-frequency bandwidth range, and allowing switching from the source cell to the target cell when the source cell and the target cell each have the at least one BWP within either the same intra-frequency bandwidth range or the same inter-frequency bandwidth range. In yet further aspects, method 900 may include switching from the source cell to the target cell are allowed for intra-band bands or inter-band bands for source and target cells having the at least one BWP within the same inter-frequency bandwidth range. In further aspects, it is noted that the term "same inter-band band" may connote two different bands. In yet further aspects, it is noted, the term "intra-frequency" may also connote a same SSB frequency for the source and target cells, whereas the term "inter-frequency" may connote different SSB frequencies for the source and target cells.

Figure 10:
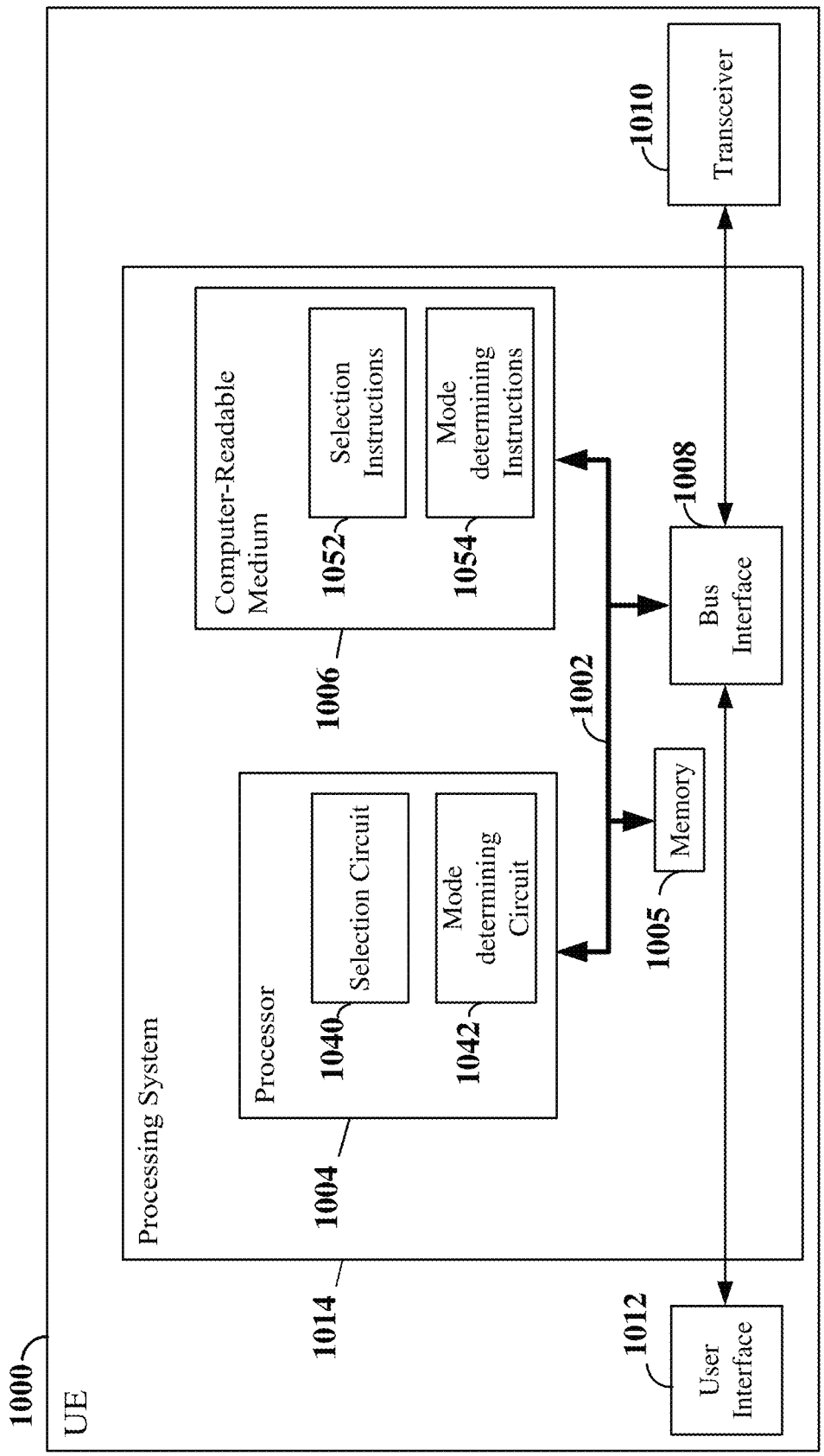
FIG. 10 is a block diagram conceptually illustrating an example of a hardware implementation for a user equipment (UE) according to some aspects.

FIG. 10 is a block diagram illustrating an example of a hardware implementation for an exemplary UE 1000 employing a processing system 1014. For example, the UE 1000 may be any of the UEs or scheduled entities illustrated in any one or more of FIGS. 1-3.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described above and illustrated in FIG. 6-9.

The processor 1004 may in some instances be implemented via a baseband or modem chip and in other implementations, the processor 1004 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described herein for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, or any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include a selection circuit 1040 configured for various functions, including, for example, the dynamic selection or determination between switching modes (e.g., switching between rules allowing only same or substantially the same BWPs or rules allowing overlapping and non-overlapping BWPs).

The processor 1004 may also include mode determining circuitry 1042 that determines one of the L1/L2-centric inter-cell mobility modes discussed above such as: (1) mode 1 where a DCI/MAC-CE can select which RRH(s) or corresponding SSBs serve a UE; (2) mode 2 where a DCI/MAC-CE can select which RRH(s) or corresponding PCI(s) and/or SSB(s) to serve the UE; or (3) mode 3 where DCI/MAC-CE can select which serving cell(s) or corresponding serving cell ID(s) to serve the UE.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

In one or more examples, the computer-readable storage medium 1006 may include selection instruction software 1052 configured for various functions, including, for example, the selection or determination between switching modes (e.g., switching between rules allowing only same or substantially the same BWPs or allowing overlapping and non-overlapping BWPs). The computer-readable storage medium 1006 may also include mode determining instructions 1052 that determine one of the L1/L2-centric inter-cell mobility modes discussed above such as: (1) mode 1 where a DCI/MAC-CE can select which RRH(s) or corresponding SSBs serve a UE; (2) mode 2 where a DCI/MAC-CE can select which RRH(s) or corresponding PCI(s) and/or SSB(s) to serve the UE; or (3) mode 3 where DCI/MAC-CE can select which serving cell(s) or corresponding serving cell ID(s) to serve the UE.

In one configuration, the UE 1000 includes means for performing the various functions and processes described in relation to FIG. 9. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-3 and utilizing, for example, the processes and/or algorithms described herein in relation to FIG. 9.

Figure 11:
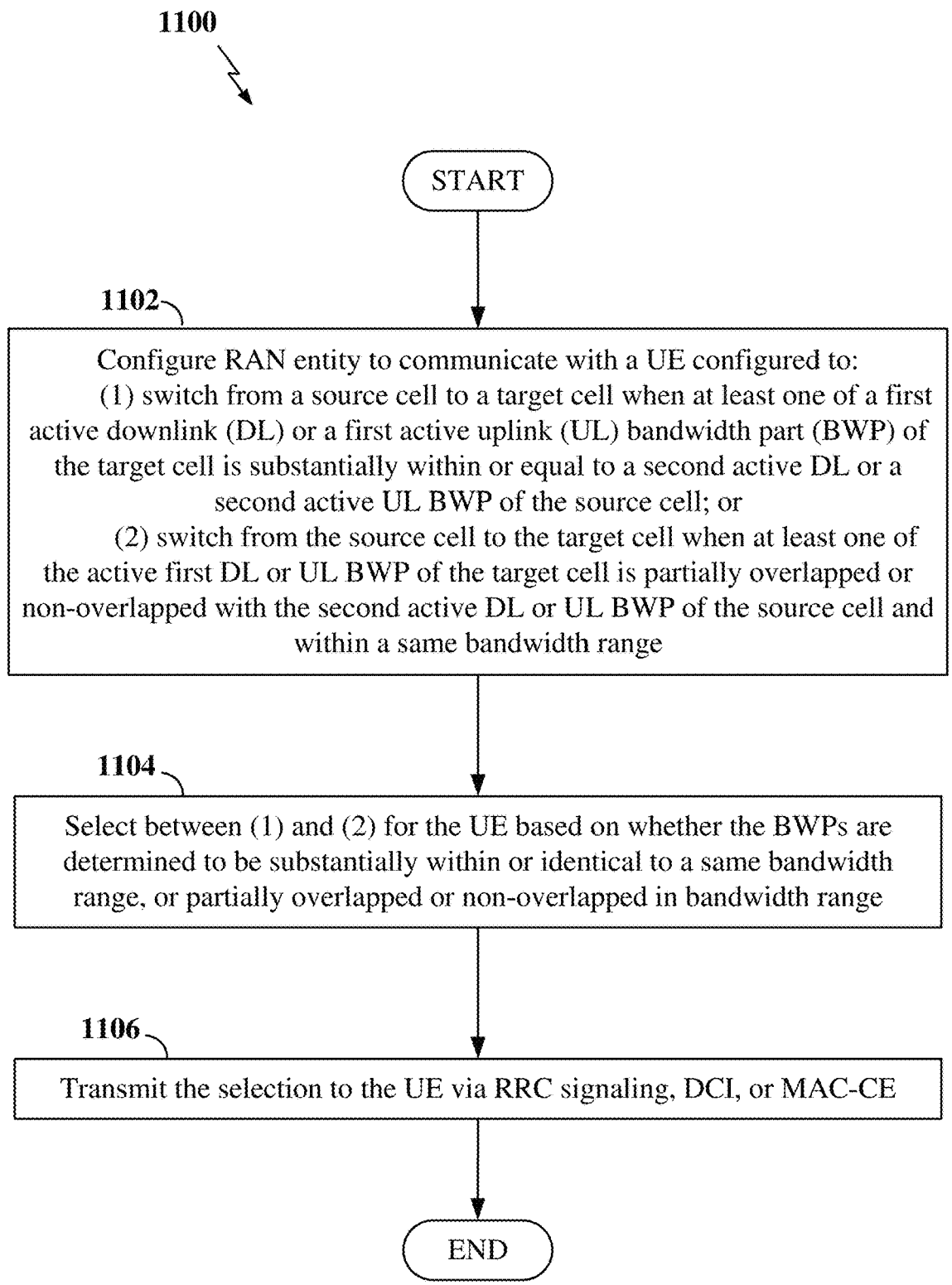
FIG. 11 is a flow chart illustrating a method in a RAN entity for L1/L2 inter-cell mobility switching according to some aspects.

FIG. 11 is a flow chart illustrating a method 1100 for L1/L2 inter-cell mobility switching according to some further aspects of the present disclosure. As described below, some or all illustrated features may be omitted in a particular implementation within the scope of the present disclosure, and some illustrated features may not be required for implementation of all embodiments. In some examples, the method 1100 may be carried out by the RAN entity illustrated in FIG. 12 and may also include processes implemented in the UE 1000 illustrated in FIG. 10. In some examples, the method 1100 may be carried out by any suitable apparatus or means for carrying out the functions or algorithm described below.

As may be seen at block 1102, method 1100 includes, within the RAN entity, configuring the RAN entity for communication with a user equipment (UE) in the wireless communication system configured to: (1) allow the UE to switch from a source cell to a target cell when at least one of an active downlink (DL) or an uplink (UL) bandwidth part (BWP) of the target cell is substantially within or equal to an active DL or UL BWP of the source cell according to a first configuration, or (2) allow the UE to switch from the source cell to the target cell when at least one of the active DL or UL BWP of the target cell is partially overlapped or non-overlapped with an active DL or UL BWP of the source cell and within a same intra-frequency bandwidth range or portion according to a second configuration.

Method 1100 further includes selecting one of the first or second configuration for the UE based on whether the active DL or UL bandwidth parts of the target and source cells are determined to be substantially within or identical in bandwidth, or to be partially overlapped or non-overlapped in bandwidth as shown in block 1104. It is noted that, in some aspects, the RAN entity may grant or configure the UE to perform at least a portion of this selection. Finally, method 100 includes transmitting the selection of the first or second configuration to the UE.

In further aspects, the method 1100 may include that the selection is received by the UE (e.g., receiving selection information) through the use of one of radio resource control (RRC) signaling, at least one MAC control element (MAC-CE), or downlink control information (DCI). In yet other aspects, method 1100 may include the RAN entity being configured to send at least one of a layer 1 (L1) control or a layer 2 (L2) control to the UE for configuring the UE for switching between the source cell and the target cell. The L1 control may include downlink control information (DCI) and the L2 control may include at least one MAC control element (MAC-CE).

Figure 12:
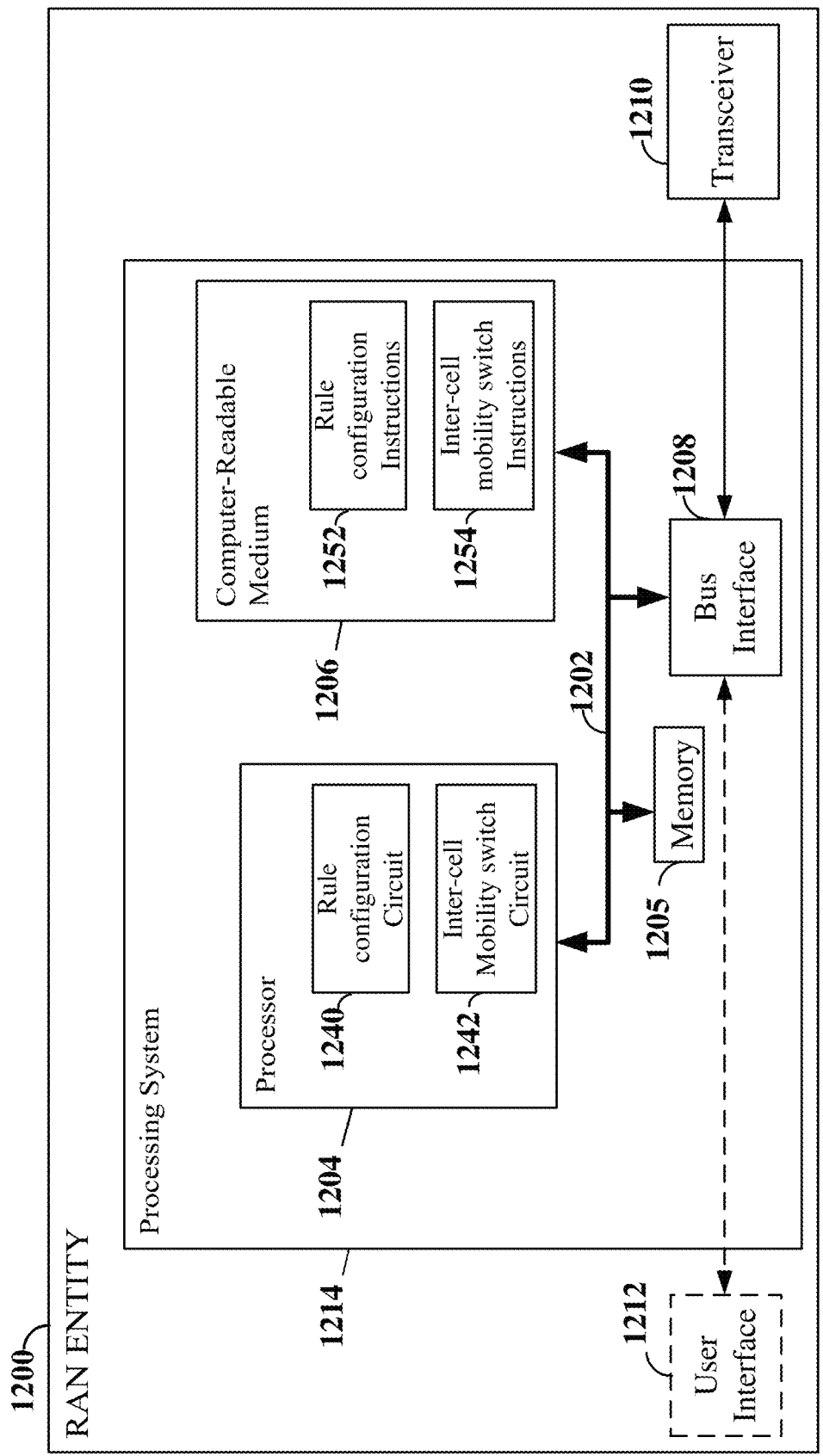
FIG. 12 is a block diagram conceptually illustrating an example of a hardware implementation for a RAN entity according to some aspects.

FIG. 12 is a conceptual diagram illustrating an example of a hardware implementation for an exemplary RAN entity or other scheduling entity 1200 employing a processing system 1214. In accordance with various aspects of the disclosure, an element, or any portion of an element, or any combination of elements may be implemented with a processing system 1214 that includes one or more processors 1204. For example, the RAN entity 1200 may be a RAN entity, base station, or gNB as illustrated in any one or more of FIGS. 1, 2, and/or 3.

The processing system 1214 may be substantially the same as the processing system 1014 illustrated in FIG. 10, including a bus interface 1208, a bus 1202, memory 1205, a processor 1204, and a computer-readable medium 1206. Furthermore, the scheduled entity 1200 may include a user interface 1212 and a transceiver 1210 substantially similar to those described above in FIG. 10. The processor 1204, as utilized in a RAN entity 1200, may be used to implement one or more of the processes described previously in connection with the methodology disclosed in FIGS. 6-9 and/or 11.

In some aspects of the disclosure, the processor 1204 may include a rule configuration circuitry 1240 configured for various functions, including, for example, setting rules, constraints, predetermined behaviors for switching a UE from a source to target cell in an L1/L2 controlled inter-cell mobility system. For example, the rule configuration circuitry 1240 may be configured to configure a UE (e.g., UE 1000) to determine when the source cell and the target cell have at least one of a common bandwidth part (BWP) or bandwidth frequencies. In other aspects of the disclosure, the processor 1104 may also include an inter-cell mobility switch circuitry 1242 configured for various functions including causing the UE 1000 to switch from the source cell to the target cell when the source cell and the target cell have at least common bandwidth parts (BWP) or bandwidth frequencies.

In other aspects, the computer-readable storage medium 1206 may include rule configuration instruction software 1252 configured for various functions, including, for example, setting rules, constraints, predetermined behaviors for switching a UE from a source to target cell in an L1/L2 controlled inter-cell mobility system. In one or more examples, the computer-readable storage medium 1206 may include inter-cell mobility switch instruction software 1254 configured for various functions, including, for example, causing the RAN entity to direct a UE to switch from a current serving source cell to a selected target cell based on the rule selection by circuitry 1240, such as when the source cell and the target cell have at least common bandwidth parts (BWP) or bandwidth frequencies.

In one configuration, the RAN entity 1200 may include means for configuring a user equipment (UE) to determine when the source cell and the target cell have at least one of a common bandwidth part (BWP) or bandwidth frequencies for switching from a source cell to a target cell in a layer 1 (L1) or layer 2 (L2) controlled inter-cell mobility system. Additionally, the RAN entity 1200 may include means for controlling or directing switching of a UE from the source cell to the target cell when the source cell and the target cell have at least common bandwidth parts (BWP) or bandwidth frequencies.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1,2, and/or 3, and utilizing, for example, the processes and/or algorithms described herein in relation to FIGS. 6-9 and/or 11.

In one configuration, the RAN entity 1200 includes means for performing the various functions and processes described in relation to FIGS. 6-9 and/or 11. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

The following provides an overview of aspects of the present disclosure:

Aspect 1: A method for wireless communication at a user equipment (UE) in a communication system supporting inter-cell mobility, the method comprising: determining in the UE whether a source cell and a target cell each have at least one bandwidth part (BWP) within a same bandwidth range; and switching from the source cell to the target cell when the source cell and the target cell each have the at least one BWP within the same bandwidth range.

Aspect 2: The method of aspect 1, wherein the switching is further configured to: switch from the source cell to the target cell when at least one of a first active downlink (DL) or a first active uplink (UL) BWP of the target cell is substantially within or equal to a second active DL or a second active UL BWP of the source cell.

Aspect 3: The method of aspect 1, wherein the switching from the source cell to the target cell comprises: switching from the source cell to the target cell when at least one of a first active downlink (DL) or a first active uplink (UL) BWP of the target cell is partially overlapped or is non-overlapped with a second active downlink (DL) or a second active uplink (UL) BWP of the source cell and within a same intra-frequency bandwidth portion or range.

Aspect 4: The method of aspect 1, wherein the switching from the source cell to the target cell comprises: switching from the source cell to the target cell when at least one of a first active downlink (DL) or a first active uplink (UL) BWP of the target cell is substantially within or equal to a second active downlink (DL) or a second active uplink (UL) BWP of the source cell according to a first configuration, or (2) switching from the source cell to the target cell when at least one of the first active downlink (DL) or the first active uplink (UL) BWP of the target cell is partially overlapped or non-overlapped with the second active downlink (DL) or the second active uplink (UL) BWP of the source cell and within the same intra-frequency bandwidth portion or range according to a second configuration, and selecting between the first configuration and the second configuration in the UE based on whether the BWPs are determined to be substantially within or identical to a same bandwidth, or partially overlapping or non-overlapping in a bandwidth within the same intra-frequency bandwidth portion or range.

Aspect 5: The method of aspects 1 or 4, wherein the selection is indicated through the use of one of a radio resource control (RRC), at least one MAC control element (MAC-CE), or at least one downlink control information (DCI).

Aspect 6: The method of aspect 1, wherein the switching from the source cell to the target cell comprises: switching from the source cell to the target cell when the source cell and the target cell have at least one of common BWPs or a shared frequency bandwidth range.

Aspect 7: The method of aspect 1, wherein the switching from the source cell to the target cell comprises: switching from the source cell to the target cell when the source cell and the target cell do not have any shared BWPs or shared frequency bandwidth range.

Aspect 8: The method of aspect 1, further comprising: determining whether the source cell and the target cell each have a bandwidth part (BWP) within at least one of a same intra-frequency bandwidth range or a same inter-frequency bandwidth range; and allowing switching from the source cell to the target cell when the source cell and the target cell each have the at least one BWP within either the same intra-frequency bandwidth range or the same inter-frequency bandwidth range.

Aspect 9: The method of aspect 1 or 8, wherein switching from the source cell to the target cell is allowed for at least one of intra-band or inter-band bands for source and target cells having the at least one BWP within the same inter-frequency bandwidth range.

Aspect 10: The method of aspects 1 through 9, wherein the switching from the source cell to the target cell comprises switching from the source cell to the target cell under the control of at least one of a layer 1 (L1) control or a layer 2 (L2) control.

Aspect 11: The method of aspects 1 through 10, wherein the L1 control comprises downlink control information (DCI).

Aspect 12: The method of aspects 1 through 11, wherein the L2 control comprises at least one MAC control element (MAC-CE).

Aspect 13: The method of aspects 1 through 12, wherein the communication system is operable according to at least one of: a first mode wherein the L1 or L2 layers are configured to be used to select a remote radio head (RRH) or an SSB ID corresponding to the RRH that is assigned for serving the UE; a second mode wherein the L1 or L2 layers are configured to be used to select a remote radio head (RRH) or a PCI corresponding to the RRH, or an SSB that is assigned for serving the UE; or a third mode wherein the L1 or L2 layers are configured to be used to select a serving cell or a serving cell ID corresponding to the serving cell that is assigned for serving the UE.

Aspect 14: The method of aspects 1 through 13, wherein the source and target cells are identified by at least one of physical cell IDs (PCIs), serving cell IDs, or remote radio heads (RRHs) having corresponding synchronization signal block (SSB) IDs.

Aspect 15: A user equipment (UE) configured for wireless communication comprising a processor, and a memory coupled to the processor, the processor and memory configured to perform a method of any one of aspects 1 through 13.

Aspect 16: A method for wireless communication at a radio access network (RAN) entity in a wireless communication system, the method comprising: configuring the RAN entity for communication with a user equipment (UE) in the wireless communication system configured to: (1) allow the UE to switch from a source cell to a target cell when at least one of a first active downlink (DL) or a first active uplink (UL) bandwidth part (BWP) of the target cell is substantially within or equal to a second active DL or second active UL BWP of the source cell according to a first configuration, or (2) allow the UE to switch from the source cell to the target cell when at least one of the first active DL or the first active UL BWP of the target cell is partially overlapped or non-overlapped with the first and second active DL or UL BWP of the source cell and within a same bandwidth portion according to a second configuration; selecting one of the first or second configuration for the UE based on whether the active DL or UL bandwidth parts of the target and source cells are determined to be substantially within or identical in bandwidth, or to be partially overlapped or non-overlapped in bandwidth; and transmitting the selection of the first or second configuration to the UE.

Aspect 17: The method of aspect 16, wherein the selection is transmitted to the UE using one of radio resource control (RRC) signaling, at least one MAC control element (MAC-CE), or downlink control information (DCI).

Aspect 18: The method of aspects 16 and 17, wherein the RAN entity is configured to send at least one of a layer 1 (L1) control or a layer 2 (L2) control to the UE for configuring the UE for switching between the source cell and the target cell.

Aspect 19: The method of aspects 16 through 18, wherein the L1 control comprises downlink control information (DCI).

Aspect 20: The method of aspects 16 through 19, wherein the L2 control comprises at least one MAC control element (MAC-CE).

Aspect 21: A radio access network (RAN) entity configured for wireless communication comprising a processor, and a memory coupled to the processor, the processor and memory configured to perform a method of any one of aspects 14 through 18.

Aspect 22: An apparatus configured for wireless communication comprising at least one means for performing a method of any one of aspects 1 through 14 or 16 through 20.

Aspect 23: A non-transitory computer-readable medium storing computer-executable code, comprising code for causing an apparatus to perform a method of any one of aspects 1 through 14 or 16 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 10, and/or 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a communication system supporting inter-cell mobility, the method comprising:
   determining in the UE whether a source cell and a target cell each have at least one bandwidth part (BWP) within a same bandwidth range; and
   switching from the source cell to the target cell when the UE determines that the source cell and the target cell each have the at least one BWP within the same bandwidth range,
   the switching from the source cell to the target cell comprising selecting a first configuration or a second configuration based on whether the BWPs are determined to be substantially within or identical to a same bandwidth, or partially overlapping or non-overlapping in a bandwidth within a same intra-frequency bandwidth range,
   wherein the selection of the first or second configuration is determined by at least one of the UE or a RAN entity in the communication system.

2. The method of claim 1, wherein the switching from the source cell to the target cell further comprises:
   switching from the source cell to the target cell when at least one of a first active downlink (DL) or a first active uplink (UL) BWP of the target cell is substantially within or equal to a second active DL or a second active UL BWP of the source cell.

3. The method of claim 1, wherein the switching from the source cell to the target cell further comprises:
   switching from the source cell to the target cell when at least one of a first active DL or a first active UL BWP of the target cell is partially overlapped or is non-overlapped with a second active DL or a second active UL BWP of the source cell and within a same intra-frequency bandwidth range.

4. The method of claim 1, wherein the selecting the first configuration or the second configuration comprises receiving an indication of the selection from the RAN entity through the use of one of a radio resource control (RRC) signal, at least one MAC control element (MAC-CE), or at least one downlink control information (DCI).

5. The method of claim 1, wherein the switching from the source cell to the target cell further comprises:
   switching from the source cell to the target cell when the source cell and the target cell do not have any shared BWPs or shared frequency bandwidth range.

6. The method of claim 1, further comprising:
   determining whether the source cell and the target cell each have a bandwidth part (BWP) within at least one of a same intra-frequency bandwidth range or a same inter-frequency bandwidth range; and
   allowing switching from the source cell to the target cell when the source cell and the target cell each have the at least one BWP within either the same intra-frequency bandwidth range or the same inter-frequency bandwidth range.

7. The method of claim 1, wherein the switching from the source cell to the target cell comprises switching from the source cell to the target cell under the control of at least one of a layer 1 (L1) control or a layer 2 (L2) control.

8. The method of claim 7, wherein the L1 control comprises downlink control information (DCI) and the L2 control comprises at least one MAC control element (MAC-CE).

9. The method of claim 7, wherein the communication system is operable according to at least one of:
   a first mode wherein the L1 or L2 layers are configured to be used to select a remote radio head (RRH) or an SSB ID corresponding to the RRH that is assigned for serving the UE;
   a second mode wherein the L1 or L2 layers are configured to be used to select a remote radio head (RRH) or a PCI corresponding to the RRH, or an SSB that is assigned for serving the UE; or
   a third mode wherein the L1 or L2 layers are configured to be used to select a serving cell or a serving cell ID corresponding to the serving cell that is assigned for serving the UE.

10. The method of claim 1, wherein the source and target cells are identified by at least one of physical cell IDs (PCIs), serving cell IDs, or remote radio heads (RRHs) having corresponding synchronization signal block (SSB) IDs.

11. A user equipment (UE) configured for wireless communication, comprising:
    a processor;
    a transceiver communicatively coupled to the processor; and
    a memory communicatively coupled to the processor,
    wherein the processor and the memory are configured to:
       determine in the UE whether a source cell and a target cell in a wireless communication system each have at least one bandwidth part (BWP) within a same intra-frequency bandwidth range;
       switch from the source cell to the target cell when the UE determines that the source cell and the target cell each have the at least one BWP within the same intra-frequency bandwidth range; and
       select a first configuration or a second configuration based on whether the BWPs are determined to be substantially within or identical to a same bandwidth, or partially overlapping or non-overlapping in a bandwidth within a same intra-frequency bandwidth range, wherein the selection of the first or second configuration is determined by at least one of the UE or a RAN entity in the communication system.

12. The UE of claim 11, wherein the processor and the memory are further configured to:
    switch the UE from the source cell to the target cell when at least one of a first active downlink (DL) or a first active uplink (UL) BWP of the target cell is substantially within or equal to a second active DL or a second active UL BWP of the source cell.

13. The UE of claim 11, wherein the processor and the memory are further configured to:
    switch the UE from the source cell to the target cell when at least one of a first active DL or a first active UL BWP of the target cell is partially overlapped or is non-overlapped with a second active DL or a second active UL BWP of the source cell and within the same intra-frequency bandwidth range.

14. The UE of claim 11, wherein the processor and the memory are further configured to select the first configuration or the second configuration by receiving selection information from the RAN entity through the use of one of a radio resource control (RRC) signal, at least one MAC control element (MAC-CE), or downlink control information (DCI).

15. The UE of claim 14, wherein the processor and the memory are further configured to switch from the source cell to the target cell under the control of at least one of a layer 1 (L1) control or a layer 2 (L2) control from the RAN entity.

16. The UE of claim 15, wherein the L1 control comprises downlink control information (DCI) and the L2 control comprises at least one MAC control element (MAC-CE).

17. The UE of claim 15, wherein the processor and the memory are configured to operate according to at least one of:
   a first mode wherein the L1 or L2 layers are configured to be used to select a remote radio head (RRH) or an SSB ID corresponding to the RRH that is assigned for serving the UE;
   a second mode wherein the L1 or L2 layers are configured to be used to select a remote radio head (RRH) or a PCI corresponding to the RRH, or an SSB that is assigned for serving the UE; or
   a third mode wherein the L1 or L2 layers are configured to be used to select a serving cell or a serving cell ID corresponding to the serving cell that is assigned for serving the UE.

18. A method for wireless communication at a radio access network (RAN) entity in a wireless communication system, the method comprising:
   configuring the RAN entity for communication with a user equipment (UE) in the wireless communication system to:
      (1) allow the UE to switch from a source cell to a target cell when at least one of a first active downlink (DL) or a first uplink (UL) bandwidth part (BWP) of the target cell is substantially within or equal to a second active DL or a second active UL BWP of the source cell according to a first configuration, or
      (2) allow the UE to switch from the source cell to the target cell when at least one of the first active DL or the first active UL BWP of the target cell is partially overlapped or non-overlapped with the second active DL or the second UL BWP of the source cell and within a same bandwidth range according to a second configuration;
   selecting one of the first or second configuration for the UE based on whether the first and second active DL or UL bandwidth parts of the target and source cells are determined to be substantially within or identical in bandwidth, or to be partially overlapped or non-overlapped in bandwidth range; and
   transmitting the selection of the first or second configuration to the UE using radio resource control (RRC) signaling.

19. The method of claim 18, wherein the selection is also transmitted to the UE using at least one MAC control element (MAC-CE) or downlink control information (DCI).

20. The method of claim 18, wherein the RAN entity is configured to send at least one of a layer 1 (L1) control or a layer 2 (L2) control to the UE for configuring the UE for switching between the source cell and the target cell.

21. The method of claim 20, wherein the L1 control comprises downlink control information (DCI).

22. The method of claim 20, wherein the L2 control comprises at least one MAC control element (MAC-CE).

23. A radio access network (RAN) entity configured for wireless communication, comprising:
   a processor;
   a transceiver communicatively coupled to the processor; and
   a memory coupled to the processor,
   wherein the processor and the memory are configured to:
      configure the RAN entity for communication with a user equipment (UE) in the wireless communication system to:
         (1) allow the UE to switch from a source cell to a target cell when at least one of an active downlink (DL) or an uplink (UL) bandwidth part (BWP) of the target cell is substantially within or equal to an active DL or UL BWP of the source cell according to a first configuration, or
         (2) allow the UE to switch from the source cell to the target cell when at least one of the first active DL or the first active UL BWP of the target cell is partially overlapped or non-overlapped with a second active DL or a second active UL BWP of the source cell and within a same bandwidth range according to a second configuration;
      select one of the first or second configuration for the UE based on whether the first and second active DL or UL bandwidth parts of the target and source cells are determined to be substantially within or identical in bandwidth, or to be partially overlapped or non-overlapped in bandwidth; and
      transmit the selection of the first or second configuration to the UE via the transceiver using radio resource control (RRC) signaling.

24. The RAN entity of claim 23, wherein the processor and memory are further configured to transmit the selection to the UE via the transceiver using at least one of MAC control element (MAC-CE) or downlink control information (DCI).

25. The RAN entity of claim 23, wherein the processor and memory are further configured to send at least one of a layer 1 (L1) control or a layer 2 (L2) control to the UE for configuring the UE for switching between the source cell and the target cell.

26. The RAN entity of claim 25, wherein the L1 control comprises downlink control information (DCI) and the L2 control comprises at least one MAC control element (MAC-CE).

* * * * *